United States Patent
Dukart

(10) Patent No.: US 6,813,966 B2
(45) Date of Patent: Nov. 9, 2004

(54) FORCE SENSOR HAVING HOLLOW CYLINDRICAL FLEXIBLE ELEMENT

(75) Inventor: Anton Dukart, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 8 days.

(21) Appl. No.: 10/439,131

(22) Filed: May 15, 2003

(65) Prior Publication Data

US 2004/0050182 A1 Mar. 18, 2004

(30) Foreign Application Priority Data

Sep. 12, 2002 (DE) .......................................... 102 42 251

(51) Int. Cl.[7] .................................................. G01L 1/12
(52) U.S. Cl. .................................................. 73/862.69
(58) Field of Search ........................... 73/779, 862.451, 73/862.621, 862.361, 862.634, 862.69

(56) References Cited

U.S. PATENT DOCUMENTS

| | | | | |
|---|---|---|---|---|
| 4,159,641 A | * | 7/1979 | Hawkes | ........................ 73/778 |
| 4,255,975 A | * | 3/1981 | Debreuille | .................... 73/784 |
| 5,459,902 A | * | 10/1995 | Hino et al. | .................... 19/236 |

FOREIGN PATENT DOCUMENTS

| | | |
|---|---|---|
| DE | 35 15 126 A1 | 10/1986 |
| DE | 102 16 723 | 3/2002 |
| WO | 00/16054 | 3/2000 |

* cited by examiner

Primary Examiner—Max Noori
(74) Attorney, Agent, or Firm—Michael J. Striker

(57) ABSTRACT

A force sensor, in particular for the determination of the forces on a vehicle seat, includes a force measuring cell (1; 19) having a Hall element. The force measuring cell (1; 19) contains a hollow-cylindrical flexible element (2; 23), which, based on the force effect (F) to be determined, causes an affect of the magnetic field in the region of the magnetic field-sensitive sensor element (11) of the force measuring cell (1; 19). The hollow-cylindrical flexible element (2; 23) contains a bar (4) on a relatively stationary end on a first support part with a magnet (5) on its free end. The flexible element held on one support part (26) projects into a top (20) held on the other support part (7), whereby the top (20) has a radially extending inner collar (21) in the region of mounting on the other support part (7). The inner collar overlaps radially a widening of diameter (22) of the flexible element (23) located in the interior of the top (20).

7 Claims, 1 Drawing Sheet

FORCE SENSOR HAVING HOLLOW CYLINDRICAL FLEXIBLE ELEMENT

BACKGROUND OF THE INVENTION

The present application relates to a force sensor, in particular, for the detection of forces on a motor vehicle seat, which, under the use of electrical or electromagnetic effects, emits an electrical signal, which corresponds to active pressure, pulling, or bending forces.

In many areas of mechanics, force sensor are necessary, which also should make possible an accurate determination of the pulling and/or pressure force on inaccessible points on apparatuses or aggregates. An electrical signal corresponds to the force measurement should be available for further evaluation or regulating processes. In the area of automobile electronics, for example, such types of force sensor can be used favorably, whereby the force sensor that have been used up to this point are, for the most part, relatively large and the manufacturing process is relatively expensive.

For individual, important electronic systems in motor vehicles, such as, for example, for seat belt systems, a smaller and compact force sensor is required. Directly on the connection points between the components in which the force concentrates, force measuring bolts a components of the force sensor are of particular interest. For example, for the seat weight force measuring and its distribution, which is measured on the connection to the seat, a force sensor is necessary, which is to be made in large numbers of pieces to be cost-effective. However, also in the manufacturing and quality measuring technology, one requires increasingly accurate, determinate measuring force sensors.

For example, a force sensor is known from DE 35 15 126 A1, in which a magnet if mounted to a free end of a bar-shaped element, whose position changes upon an outer load of the mounting element relative to a magnetic field-sensitive sensor element. In this manner, the sensor element is arranged fixed in a region of a bearing position of the mounting element and produced an electrical signal depending on the change of the magnetic field.

In addition, a measurement received for recognition of movement in a vehicle seat is known from WO 00/16054 A1, in which between an upper support enclosing the seat shell and a lower support on the vehicle floor, likewise, also attached via a length and height adjustment mechanism, an elastic deformation of a mounting element is determined with the measuring cell.

In the non-published DE 102 16 723.0, another force measurer is describe, in particular, for seat weight measurement in a motor vehicle, in which a magnet and a sensor element are arranged fixedly to one another in a force absorbing element and with an impact, changes by means of the force to be sensed a distance to an adjacently arranged ferromagnetic material.

SUMMARY OF THE INVENTION

A force sensor of the above-described type, in particular, for the determination of the forces on a vehicle seat, has a force-absorbing element between two support parts. Here, a force measuring cell for measuring the forces is arranged between the support parts, for example, the seat rails and the seat rocker, whereby the force measuring cell has a magnetic field-sensitive sensor element. The force measuring element contains a hollow-cylindrical flexible element, for example, in the form of a bolt, which based on the force effect to be detected, causes an affect of the magnetic field in the area of the magnetic field-sensitive sensor element of the force measuring cell. The hollow-cylindrical flexible element contains a bar with a magnet on its free end attached to a relative stationary end on a first support part.

With the force measuring cell, the magnetic field-sensitive sensor element, for example, a Hall element or a similar magneto-resistive or inductive sensor, can be moved to the field of the magnet by the force acting on the other support part and also on the flexible element. In addition, it is advantageous that the flexible element held on the first support part projects into a top held on the other support part, whereby the top has a radially extending inner collar in an area of mounting to the other support part. The inner collar radially overlaps a widening of the diameter of the flexible element in the interior of the top.

The inventive top for the flexible element, for a bolt as a flexible element, is therefore so construed that this can be joined together from the side with the bolt, and in this manner, the rotationally symmetrical inner collar can be conned to the widening of the diameter of the bolt. The inner collar, therefore, can be dimensioned in an advantageous manner, such that in the case of breaking of the volt-flexible element, for example, with a bad accident of the vehicle, with a use on a vehicle seat attachment, the bolt is not longer separated by the axial limit stop of the inner collar and the vehicle seat remains fixed on the seat rails.

In addition, an impact is absorbed in the vertical direction by the inner collar, whereby the impact essentially can take place more effectively with a smaller residual moment. The inner collar, also in the case of a horizontal transverse force, leads to an impact between the inner collar and the bolt, whereby the constructive design is more advantageous.

The bolt top can also be clamped in a simple manner on the seat rocker as the other support part between a locking ring or a locking clamp and an outer radial widening on the top. This has the particular advantage that the bolt can be more easily built into and dismantled from a pre-assembled vehicle seat. In addition, the top can be designed such that this can be mounted without a threading of the connecting cable of the sensor element, for example, a Hall-IC or its plug.

Also the attachment of the bolt to the seat bar as the first support part can be improved in a simple manner in this regard, in that the bolt-flexible element is guided through the first support part, here the seat rail, from outside and is provided on this end with a groove for receiving a locking ring for attachment.

In addition, it is advantageous if the end of the bolt-top abutting the seat rocker as the other support part and opposite the seat rail comes with a ring seal between the seat rail and the seat rocker. In this manner, very simply and effectively, a sealing of the bolt and in particular, also the gap between the bolt top, the bolt, and the seat rail can take place for an overload impact.

According to a further advantageous embodiment, the bar with the magnet attached to the relative stationary end on the first support part is a separate cylindrical component, whose material selection is independent from its magnetic characteristics and the material of the flexible element. In this regard, the magnet and, for example, a Hall-IC as the sensor element, can be separately mounted and the sensitivity and the material selection for the bolt as the flexible element are simplified.

DETAILED DESCRIPTION OF THE PREFERRED EMBODIMENTS

Figure 1:
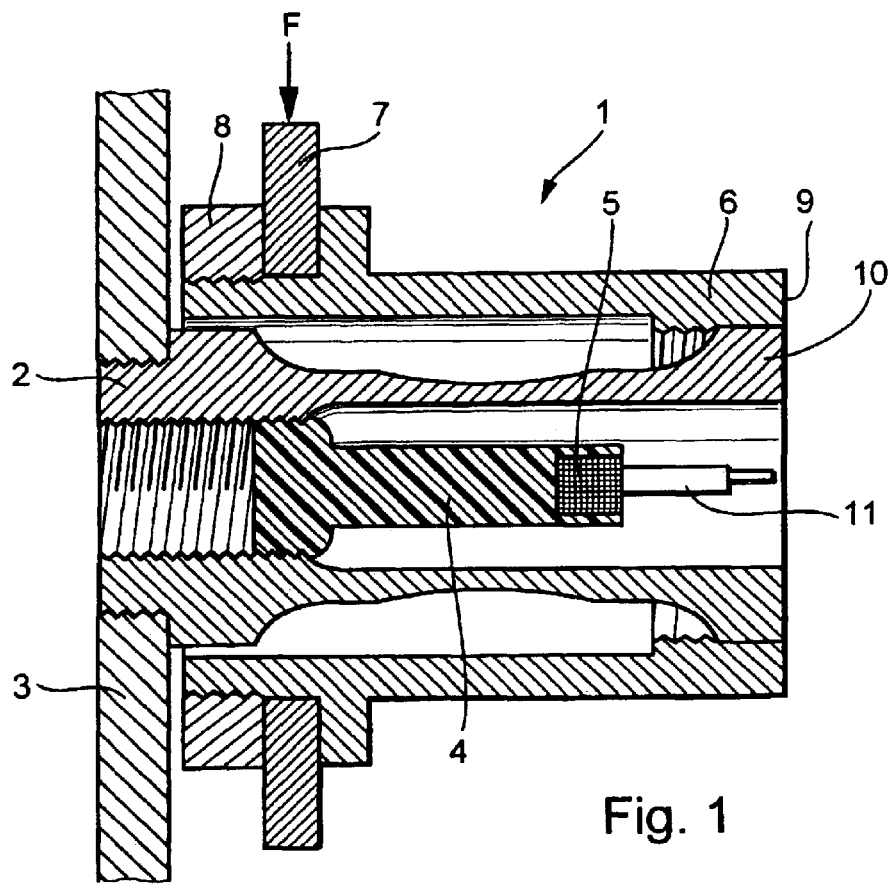
FIG. 1 shows a section through a principal structure of a force measuring cell for a vehicle seat in a motor vehicle with a Hall element as a sensor element.

In FIG. 1, a principal construction of a force measuring cell 1 for a force sensor is shown, such as, for example, one that can be used for the weight determination on a vehicle seat of a motor vehicle (not shown). The force-measuring cell 1 has here a bolt 2 as a flexible element, which is attached to a rail (not shown) as a first support part of the vehicle seat, for example, by means of a coupling nut on the end 3 of the bolt 2.

In the interior of the bolt 2, a cylindrical bar 4, which is made from a different material than the bolt 2, including a non-magnetic material, can be manufactured. On the free end of the bolt 2, a permanent magnet 5 is pressed into a bore. In addition, a top 6 is provided, in whose interior, the bolt 2 comes to lie with the magnet 5. The top 6 is attached to a rocker 7 as the other support part of the vehicle seat, herewith a connecting nut 8, whereby a force F to be measured acts on the rocker 7. On the end 9 of the top 6 on which also the other end of the bolt 2 is attached, a Hall-IC 11 is held in a component 10 as a sensor element, which, with a movement of the rocker 7, produces an electrical output signal dependent on the force F.

Figure 2:
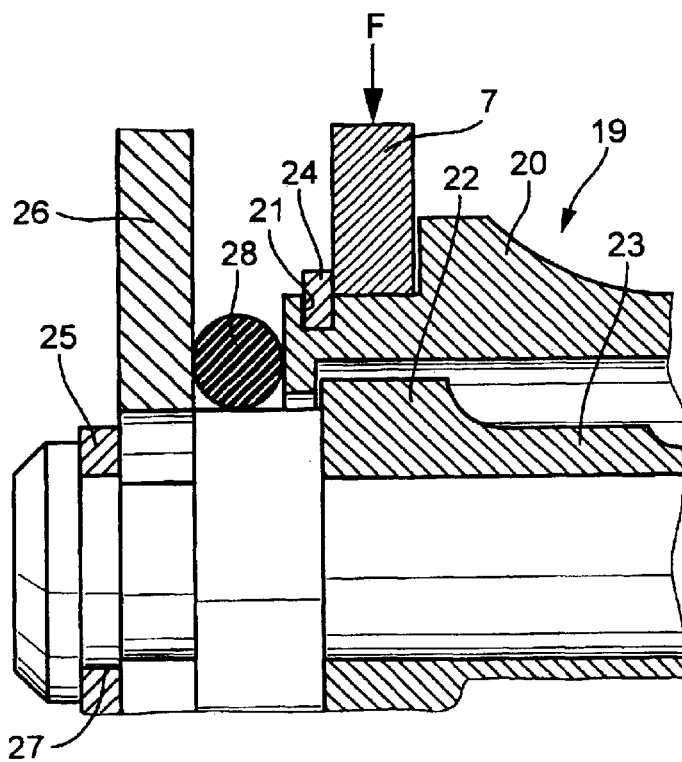
FIG. 2 shows a section through an inventive embodiment with a bolt-flexible element with an inner collar in the force measuring cell.

The inventive embodiment according to FIG. 2 shows in enlargement the illustration of FIG. 2 a force measuring cell 19 with a top 20, which is provided with a rotationally symmetrical inner collar 21, which overlaps a radial widening 22 on a bolt 23 as a flexible element. The function of the bolt 23 corresponds thereby in principle with the function of the bolt 2 according to FIG. 1. The top 20 according to FIG. 2, in contrast to the top 6 in FIG. 1, is held with a locking ring 24 to the rocker 7.

The bolt 23 here likewise is held with a locking ring 25 on the rails 26 as a support part, which is mounted in a corresponding groove 27 of the bolt 23. Between the inner collar 21 and the rail 26, as well as the part of the bolt 23 lying here, an O-ring 28 is includes as a sealing ring. In this manner, the sealing of the bolt 23 and in particular, also the gap between the bolt top 20, the bolt 23 and the seat rail 26 is ensured for an overload impact.

The inner collar 21 according to FIG. 2 is dimensioned such that in the case of a break in the bolt 23, this fixes the top, and therewith the seat rocker 7 on the seat rail 26, by means of the axial impact on the inner collar 21.

It will be understood that each of the elements described above, or two or more together, may also find a useful application in other types of constructions differing from the types described above.

While the invention has been illustrated and described herein as a force sensor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Force sensor, with a force measuring cell (1; 19) is arranged between two support parts (7, 26) for measuring the forces between the support parts (7, 26), wherein the force measuring cell (10) has a magnetic field-sensitive sensor element (11), wherein the force measuring cell (1; 19) contains a hollow-cylindrical flexible element, which based on the force effect (F) to be detected causes an affect of the magnetic field in a region of the magnetic field-sensitive sensor element (11) of the force measuring cell (1; 19), whereby the hollow-cylindrical flexible element (2; 23) contains a bar (4) with a magnet (5) on its free end attached to a relatively stationary end on the first support part, characterized in that the magnetic field-sensitive sensor element (11) can be moved by the force (F) in the field of the magnet (5) and that the flexible element (23) held on a first support part (26) part protrudes into a top (20) held on a second support part (7), whereby the top (20) has a radially extending inner collar in a region of mounting, wherein the inner collar radially overlaps a widening of diameter (22) of the flexible element (23) in an interior of the top (20).

2. Force sensor according to claim 1, characterized in that the top (20) is clamped on the second support part (7) between a locking ring (24) and an outer radial widening on the top (20).

3. Force sensor according to claim 1, characterized in that the end of the top (20) adjacent to the second support part (7) and opposite to the first support part (26) abuts the second support part (7) via a ring seal (28).

4. Force sensor according to claim 1, characterized in that the bar (20) attached to the relatively stationary end on the first support part (26) is a separate cylindrical component with the magnet (5), whose material selection is independent from its magnetic characteristics and the material of the flexible element (2; 23).

5. Force sensor according to claim 1, characterized in that the flexible element (23) penetrates through the first support part (26) and is provided on this end with a groove (27) for receiving a locking ring (25) for attachment on the first support part (26).

6. Force sensor according to claim 1, characterized in that the force measuring cell (19) is used for determining forces on a vehicle seat of a motor vehicle, whereby the first support part represents an attachment rail (26) for the vehicle seat on a body of the motor vehicle and the second support part represents a rocker (7) on which the vehicle seat is held.

7. Force sensor according to claim 1, characterized in that the magnetic field-sensitive sensor element is a Hall element (11).

* * * * *